United States Patent
Myszkowski

(10) Patent No.: US 8,727,411 B2
(45) Date of Patent: May 20, 2014

(54) COVER FOR FLOOR-LOCATED VEHICLE IDENTIFICATION NUMBER

(75) Inventor: Marek Myszkowski, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 70 days.

(21) Appl. No.: 13/326,692

(22) Filed: Dec. 15, 2011

(65) Prior Publication Data

US 2013/0152439 A1    Jun. 20, 2013

(51) Int. Cl.
*B60R 13/10* (2006.01)

(52) U.S. Cl.
USPC ........................................ 296/1.06; 296/1.08

(58) Field of Classification Search
CPC ...... B60R 13/00; B60R 13/10; B60R 13/105; B60R 2013/0287; B60N 3/046; G09F 3/18
USPC .............. 296/37.14, 37.15, 37.16, 1.06, 1.07, 296/97.23, 193.07
See application file for complete search history.

(56) References Cited

U.S. PATENT DOCUMENTS

| | | | | |
|---|---|---|---|---|
| 4,560,083 A | * | 12/1985 | Danico | 220/786 |
| 4,761,319 A | * | 8/1988 | Kraus et al. | 428/99 |
| 4,801,040 A | * | 1/1989 | Kraus | 220/787 |
| 5,327,682 A | * | 7/1994 | Holtz | 49/463 |
| 5,358,291 A | * | 10/1994 | Malmanger et al. | 292/175 |
| 7,010,885 B2 | * | 3/2006 | Helferty | 49/463 |
| 7,410,200 B2 | * | 8/2008 | Kirschener | 296/97.7 |

FOREIGN PATENT DOCUMENTS

| | | |
|---|---|---|
| CN | 1958342 A | 5/2007 |
| CN | 2915601 Y | 6/2007 |
| JP | 2004-58915 A | 2/2004 |
| KR | 10-2005-0034295 A | 4/2005 |
| KR | 2005034295 A * | 4/2005 |
| KR | 10-2005-0113022 A | 12/2005 |
| WO | 2007/008104 A1 | 1/2007 |

* cited by examiner

Primary Examiner — Jason S Morrow
Assistant Examiner — E. Turner Hicks
(74) Attorney, Agent, or Firm — Standley Law Group LLP

(57) ABSTRACT

Improved covers for floor-located vehicle identification numbers (VINs) are disclosed. Exemplary VIN cover embodiments may be of a simple one-piece design and may include tabs or other retention elements along underside edges thereof. The retention elements engage the vehicle carpet and trap the carpet when the cover is installed into a VIN viewing window provided in the carpet. The underside of the cover may also include a carpet gripping mechanism that engages the carpet surface and helps to maintain the position of the cover after installation. A section of vehicle carpet removed to permit viewing of the VIN may optionally be retained and installed to the underside of the cover so as to reside in the window area when the cover is in place.

20 Claims, 3 Drawing Sheets

COVER FOR FLOOR-LOCATED VEHICLE IDENTIFICATION NUMBER

TECHNICAL FIELD

The present invention is directed to vehicle identification number covers, especially for vehicle identification numbers located on a vehicle floor.

BACKGROUND

Vehicle manufacturers have traditionally placed a vehicle identification number (VIN) at least on an externally visible portion of the vehicle dashboard. For example, an engraved VIN plate is commonly placed in a lower corner of an outwardly facing portion of a vehicle dashboard so that it may be viewed through the windshield from the driver's side of the vehicle. A window may be provided so that the VIN is visible through an edge decoration (e.g., paint band) of the windshield.

It is also known to additionally stamp a VIN into a dashboard/firewall body panel that resides forward of the visible dashboard near a rear underhood or cowl area. However, due to design changes introduced to improve pedestrian safety in a pedestrian-vehicle collision, this VIN stamping location is no longer practical. Consequently, it has been decided to relocate this stamped VIN to the floor panel of the vehicle.

Because of the remote location and possibly sealed arrangement of traditional dashboard-mounted VIN plates, obstruction by dust and debris, abrasion, etc., has never been particularly problematic. Similarly, the above-described traditional location of the stamped VIN is not particularly susceptible to debris collection nor to damaging contact with other objects.

This is not necessarily the case with floor-located VINs, where dirt and other debris may obstruct or damage a VIN by passing through and/or collecting in a carpet cutout provided for the purpose of viewing the VIN. Further, in the case of a VIN placed in/on a vehicle floor panel during vehicle production, the VIN location may be determined largely by the equipment (e.g., rolling machine) that places the VIN in the floor panel. Consequently, the resulting VIN location may be substantially under the feet of an occupant of the vehicle to which the floor panel is installed. Such a location obviously exacerbates potential problems caused by dirt and other debris.

As a result of such concerns, various covers for floor-located VINs either exist or have been proposed. However, existing and proposed VIN covers for floor-located VINs are expensive and complicated, and have been manufactured from hard materials that have an unpleasant feeling under the feet of a vehicle occupant. VIN covers according to the invention overcome these problems.

SUMMARY

The invention is directed to improved covers for floor-located VINs. Exemplary VIN cover embodiments are preferably of a simple one-piece design and may be molded from a softer material than known covers to promote cover flexibility and improve underfoot feeling. For example, a VIN cover according to the invention may be manufactured (e.g. molded) from a thermoplastic elastomer (TPE) material.

In order to simplify manufacture and installation of a VIN cover of the invention, the cover may be of a simple (e.g., substantially rectangular) shape and its underside may include tabs or other carpet engaging features that simplify and facilitate installation. More specifically, the carpet engaging features engage the backing of the vehicle carpet and trap the carpet when the cover is installed into a cutout (window) provided in the carpet in the area of the VIN. The underside of the cover may also include a carpet gripping structure, such as a plurality of pointed nibs that penetrate the carpet surface and help to maintain the position of the cover after installation. VIN covers of the invention eliminate the need for a two-part VIN cover and the need for one of the VIN cover parts to be located subjacent to the vehicle carpet.

The section of vehicle carpet removed to permit viewing of the floor-located VIN may optionally be retained and installed to the underside of a VIN cover of the invention so as to reside in the cutout area when the cover is in place. While this is not critical to the invention, it is believed that employing the carpet section in this manner may help to optimize vehicle noise, vibration and harshness (NVH) characteristics.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1A:
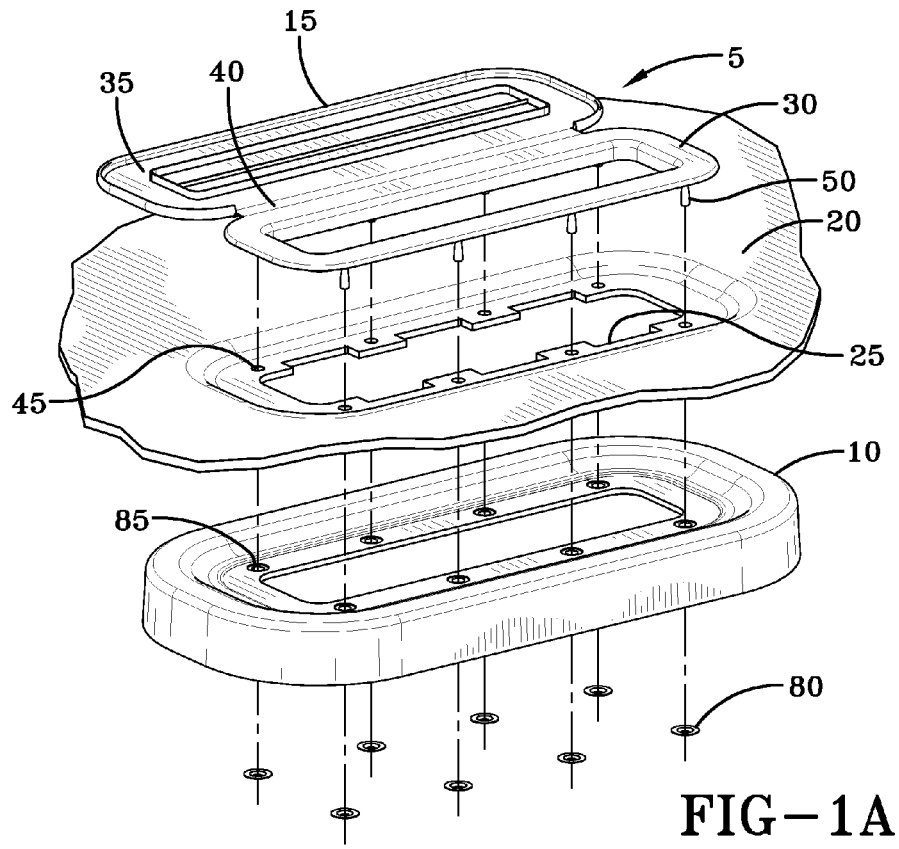
FIG. 1A is an exploded view of one known cover for a floor-located VIN.
Figure 1B:
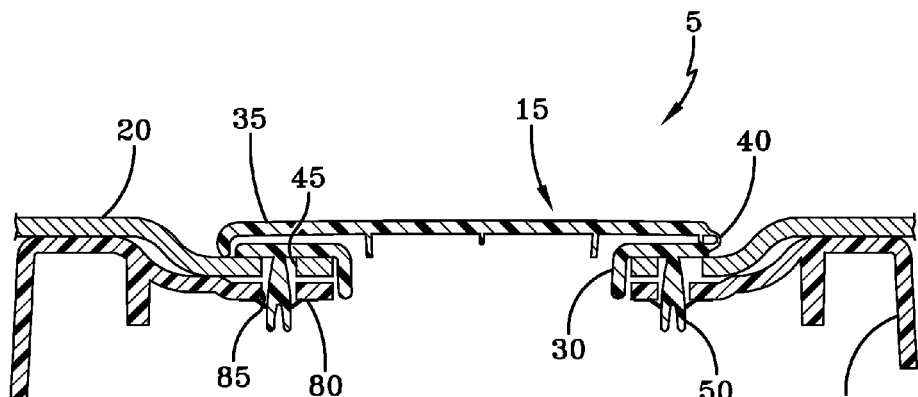
FIG. 1B is a cross-sectional view of the VIN cover of FIG. 1A installed to the carpet of a vehicle.

One version of a known cover 5 for a floor-located VIN is depicted in FIGS. 1A-1B. As shown, this cover 5 is a two-part assembly comprising a lower, retention portion 10, and an upper, cover portion 15. The retention portion 10 must be located subjacent to a vehicle carpet 20 so as to reside between a vehicle floor panel (not shown) and an underside of the vehicle carpet.

Each of the retention portion 10 and cover portion 15 of the cover 5, as well as the vehicle carpet 20, are shown to include a cutout or window 25 through which a VIN stamped or otherwise placed in/on the vehicle floor panel may be viewed. The cover portion 15 of the cover 5 is shown to include an open frame portion 30 to which is attached a solid cover element 35. The intersection of the frame portion 30 and the cover element 35 forms a living hinge 40 via which the cover element can be pivoted between an open and closed position.

From an observation of both FIGS. 1A and 1B, it can be understood that the construction and process for engaging the retention portion 10 and the cover portion 15 of the cover 5 and for securing the cover to the vehicle carpet 20 is complicated. Particularly, both the carpet 20 and the retention portion 10 of the cover 5 include a plurality of holes 45, 85 for allowing the respective passage of corresponding pins 50 of the cover portion 15. Further, the assembled state of the cover 5 must be maintained by push nuts 80 that reside beneath the retention portion 10 and engage the pins 50 of the cover portion after they pass through the holes 85 in the retention portion.

As should be apparent, the design of the cover 5 requires a substantially detailed and complex mold, as the pins 50 of the cover portion 15 must precisely align with the holes 85 in the retention portion 10 of the cover. Additionally, the holes 45 associated with the window 25 in the vehicle carpet 20 must be precisely located to be aligned with the pins 50 of the cover portion 15 and the holes 85 in the retention portion 10 of the cover 5. Assembly of the cover 5 to the vehicle carpet 20 is similarly complicated because the retention portion 10 must be properly located subjacent to the carpet and simultaneously over the VIN, while the pins 50 of the cover portion 15 must be passed through the holes 45 in the carpet, then through the holes 85 in the retention portion and, finally, through the push nuts 80.

The complex nature of the cover 5 adds to its cost of manufacture and the time required for its installation. The thickness of the retention portion 10 of the cover 5 and its location beneath the vehicle carpet 20 also results in a carpet bulge around the VIN, which may be unsightly and is detectable under the foot of a vehicle occupant. Therefore, it should be understood that there is a need for an improved floor-located VIN cover. One exemplary embodiment of such a VIN cover is described below.

Figure 2:
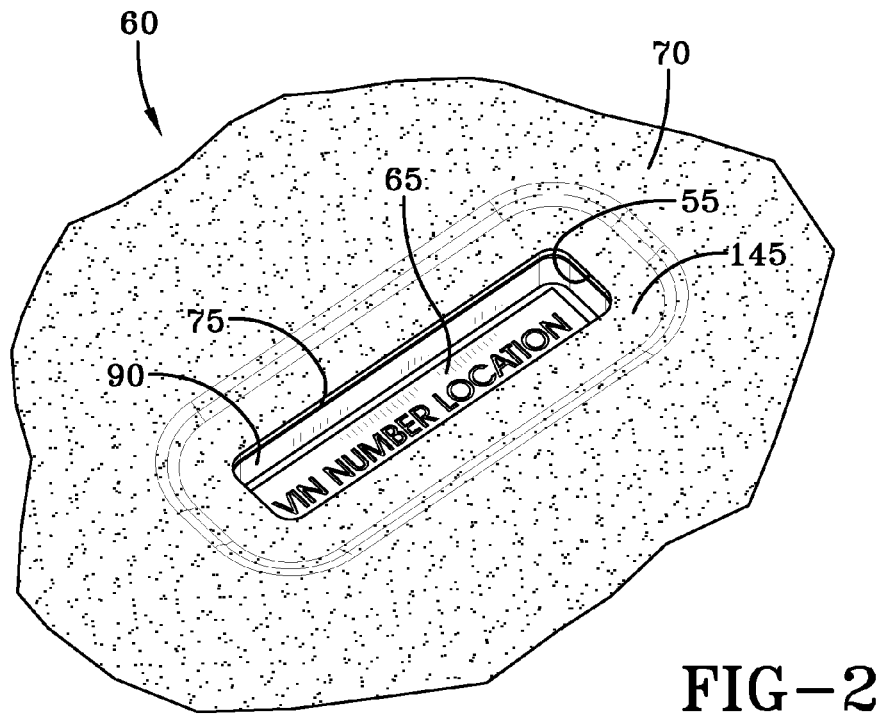
FIG. 2 is a perspective view of a section of an exemplary vehicle carpet having a cutout (window) through which an underlying VIN may be viewed.

An exemplary cut out or window 55 in an exemplary vehicle carpet 60 for the purpose of revealing (viewing) a floor-located VIN 65 is depicted in FIG. 2 without a cover in place. As can be observed, the VIN 65 is located in a vehicle floor panel that resides beneath the vehicle carpet 60. The VIN may be stamped, engraved, laser cut or otherwise placed in the vehicle floor panel, or may be located on a separate plate, etc., that is attached to the vehicle floor panel. Typically, the vehicle carpet 60 includes a pile layer 70 that forms the visible surface of the carpet, a backing layer 75 (e.g., a mass back layer) immediately underlying the pile layer, and a padded insulator layer 90 that underlies the backing layer and typically resides against the vehicle floor panel (see also, FIG. 5).

This particular embodiment of the VIN window 55 also includes an optional VIN cover recess 145. The VIN cover recess 145 is a recessed or sunken area of the vehicle carpet 60 that surrounds the VIN window 55, and is designed to receive a cover body portion of a VIN cover of the invention, as is described below. Consequently, the VIN cover recess 145 is preferably of a shape that substantially mimics the shape of the cover body of the VIN cover that will be installed thereto.

As should be apparent from FIG. 2, the VIN window 55 in the vehicle carpet 60 forms a repository for dirt and other debris that may be introduced to the vehicle carpet during normal use of the vehicle. Additionally, when the VIN 65 and associated VIN window 55 are located in an area of the vehicle carpet 60 that will be occupied by the feet of a vehicle occupant, scratching or other marring of the VIN may also occur.

Figure 3:
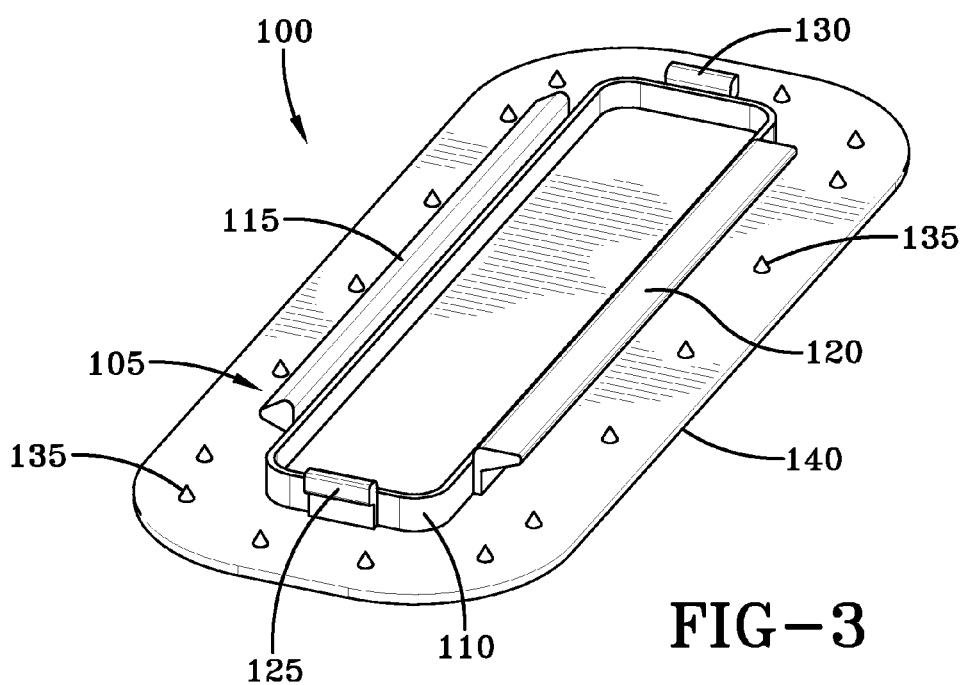
FIG. 3 is an enlarged bottom perspective view of an exemplary floor-located VIN cover of the invention.

Referring now to FIG. 3, one exemplary embodiment of a floor-located VIN cover 100 of the invention may be observed. The VIN cover 100 is shown in an inverted position in FIG. 3, such that the underside or carpet-contacting surface of the cover is visible. In this particular exemplary embodiment, the VIN cover 100 is shown to be of substantially rectangular shape so as to substantially correspond to the general shape of the VIN window 55 located in the vehicle carpet 60 of FIG. 2. While a rectangular shape is likely to be most typical due to the linear arrangement of the alphanumeric characters of most VINs, it is to be understood that other VIN cover shapes are also within the scope of the present invention.

The VIN cover 100 may be manufactured from a variety of materials. For example, the VIN cover 100 may be molded from a plastic material that preferably imparts at least some amount of flexibility to the VIN cover. To this end, the VIN cover 100 may be non-exclusively manufactured from a thermoplastic elastomer (TPE) material or another material having similar characteristics. Other materials, including non-plastic materials, could also be employed if appropriate to a given installation.

A VIN cover of the invention, such as the VIN cover 100, is designed to directly engage the vehicle carpet in the area of the VIN window cut therein, such that a separate retention portion is not required. To this end, the VIN cover 100 is shown to include a carpet engaging structure 105.

In this particular example, the carpet engaging structure 105 includes an upstanding wall 110 that extends outward from the underside of a cover body 140 of the cover 100 and traces a path that substantially mimics the shape of the VIN window 55 located in the vehicle carpet 60. The height of the upstanding wall 110 may vary in accordance with the thickness of the vehicle carpet pile and backing layers 70, 75. In other embodiments, the upstanding wall 110 may also be discontinuous, rather than continuous as shown. For example, and without limitation, the upstanding wall may be absent along all or a portion of one or more carpet retention tabs 115, 120, 125, 130 that are also part of the carpet engaging structure 105 (see below). In cases where the upstanding wall is discontinuous along a carpet retention tab, one or more small reinforcing ribs may be provided if desired to strengthen the tabs.

The carpet engaging structure 105 also includes at least one carpet retention element that is provided to secure the VIN cover 100 to the vehicle carpet 60. In this case, the at least one carpet retention element is comprised of a plurality of retention tabs 115, 120, 125, 130 that are formed along opposing sections of the upstanding wall 110 and extend at least partially transversely therefrom so as to form carpet retention slots between the tabs and an underside of the cover body 140. In some embodiments, one or more of the retention tabs 115, 120, 125, 130 may extend directly from the underside of the cover body 140 and may be separate from or at least partially connected or integral to the upstanding wall 110 (when present). In other embodiments, one or more of the retention tabs 115, 120, 125, 130 may be wholly integrated into the upstanding wall 110 and may extend at least partially transversely therefrom. In any case, the retention tabs 115, 120, 125, 130 shall be considered herein to extend from the cover body, regardless of whether they are directly connected thereto or indirectly connected thereto by an upstanding wall or another element(s).

Different VIN cover embodiments of the invention may include carpet engaging structures of different designs or structures having different numbers of such tabs (including a single continuous tab), which tabs may be of varying size, shape and location. In this particular example, the carpet engaging structure 105 includes carpet retention tabs 115, 120 that extend along the longer sides of the upstanding wall 110 and carpet retention tabs 125, 130 that extend along the shorter sides of the upstanding wall.

The carpet retention tabs 115, 120 that extend along the longer sides of the upstanding wall 110 in this embodiment are shown to be longer than the carpet retention tabs 125, 130 that extend along the shorter sides of the upstanding wall.

However, this may not be the case in other embodiments. The carpet retention tabs 115-130 are designed to engage the vehicle carpet 60 when the VIN cover 100 is installed thereto, as is described in more detail below.

In the particular exemplary embodiment shown, the carpet retention tabs 115, 120 that extend along the longer sides of the upstanding wall 110 can be seen to have a different design or cross-section. In this case, the first carpet retention tab 115 may be considered a clipping or engaging tab and the second carpet retention tab 120 may be considered a hooking tab. More specifically, these tabs 115, 120 are designed to facilitate VIN cover 100 installation by allowing the hooking tab 120 to be first inserted into the VIN opening 55 with the VIN cover held at a slight angle. In this manner, the hooking tab 120 can be easily engaged with an exposed corresponding edge of the vehicle carpet 60, and the VIN cover 100 may be subsequently rotated downward until the engaging tab 115 enters the VIN opening 55 and engages a corresponding opposite edge of the vehicle carpet. The retention tabs 125, 130 along the short edges of the upstanding wall 110 will also become engaged with corresponding edges of the vehicle carpet 60 at this point.

The exemplary VIN cover 100 is further shown to include a plurality of carpet gripping projections 135, which are shown herein in the form of small pointed bosses, but which may be of other designs. The carpet gripping projections extend outward from the underside of the cover body 140 of the VIN cover 100 so as to be in contact with the pile layer 70 of the carpet 60 when the VIN cover is installed to the VIN window 55 therein. As should be apparent, the pointed ends of the carpet gripping projections 135 will typically penetrate at least the pile layer 70 of the carpet 60 to some degree, thereby helping to prevent the VIN cover 100 from sliding so that the proper position of the VIN cover with respect to the VIN may be maintained.

Figure 4:
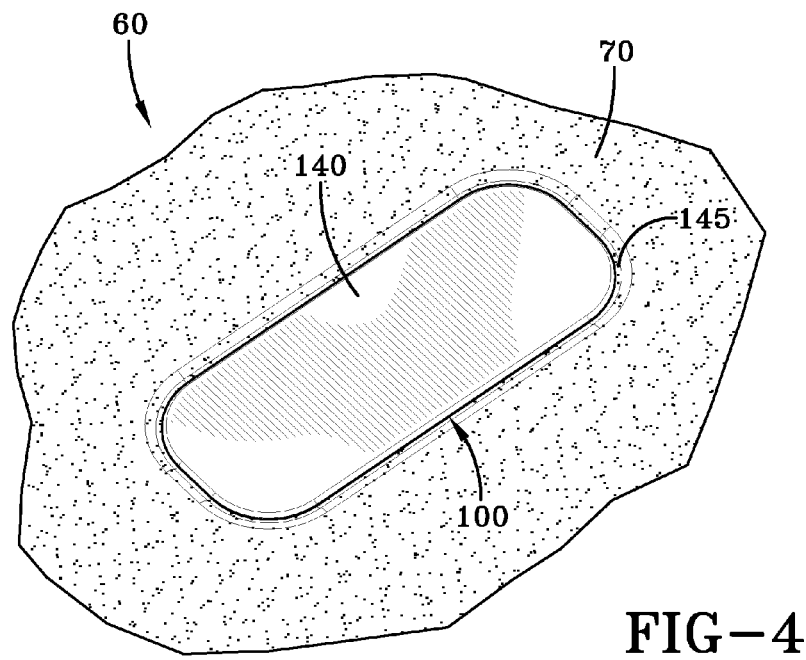
FIG. 4 shows the carpet section of FIG. 2 after an exemplary VIN cover of the invention has been installed to the window and secured to the carpet.
Figure 5:
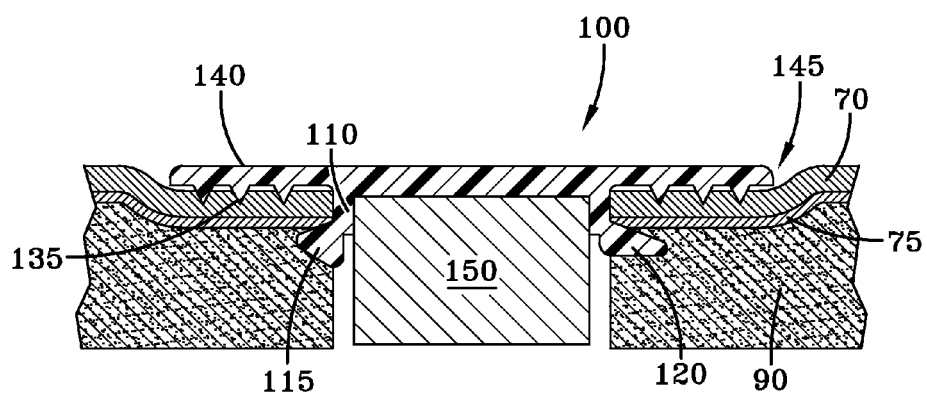
FIG. 5 is a cross-sectional side view showing an exemplary VIN cover of the invention installed to a VIN cutout in a vehicle carpet.

Referring now to FIGS. 4-5, the VIN cover 100 of FIG. 3 is shown installed to the VIN window 55 in the carpet 60 of FIG. 2. As can be observed, when the VIN cover 100 is installed to the VIN window 55 and within the VIN cover recess 145, the cover body 140 thereof presents an unobtrusive, substantially flat and non-projecting covering surface. Preferably, but not essentially, the fit of the VIN cover 100 to the VIN window 55 and VIN cover recess 145 is such that the exposed surface of the cover body 140 is substantially planar with the exposed surface 70 of the vehicle carpet 60. In this manner, the chance of underfoot detection of the VIN cover 100 by a vehicle occupant is minimized. In other embodiments, the cover body may reside slightly below or above the level of the exposed surface of the carpet pile layer 70.

In yet other embodiments, a VIN cover of the invention may be installed to a vehicle carpet that lacks a VIN cover recess. In this case, the cover body of the VIN cover will project above the surface of the carpet pile layer. However, because of the thin nature of the cover body and the lack of a separate under-carpet retention portion, such an embodiment will still feel less obtrusive underfoot than VIN covers of known design.

As further shown in FIG. 5, when the VIN cover 100 is installed, the upstanding wall 110 of the carpet engaging structure 105 preferably resides at least partially within the VIN window 55 and the carpet retention tabs 115, 120 are engaged with the carpet 60. More specifically, the carpet retention tabs 115, 120 pass through the VIN window 55 and, in this embodiment, extend outward so as to engage the backing layer 75 and to trap the pile layer 70 and backing layer between the carpet retention tabs and the cover body 140 of the VIN cover 100. While not shown in FIG. 5, the carpet retention tabs 125, 130 perform a like function.

In this particular embodiment, the carpet 60 includes an insulator layer 90 and, therefore, the carpet retention tabs 115, 120 extend to some degree between the insulator layer and backing layer 75 of the carpet. In other applications, the insulator layer may be absent. In yet other embodiments, the carpet retention tabs may engage only the pile layer 70 of the vehicle carpet 60.

As a result of the above-described engagement, the VIN cover 100 is securely but removably affixed to the vehicle carpet 60 and securely retained within the VIN window 55. The flexibility of the VIN cover 100 may assist with passing the carpet engaging structure 105 through the VIN window 55 and placing the carpet retention tabs 115-130 into proper engagement with the vehicle carpet 60.

In addition to engagement of the vehicle carpet 60 by the carpet retention tabs 115-130 of the carpet engaging structure 105, the carpet gripping projections 135 also penetrate into at least the pile layer 70 of the carpet to dissuade or prevent sliding movement of the VIN cover 100 along the carpet surface. The degree of penetration may vary. For example, the carpet gripping projections 135 may penetrate only into the pile layer 70 of the carpet 60, or the carpet gripping projections may penetrate through the pile layer and into the backing layer 75 or the insulator layer 90.

In other embodiments of the invention, the pointed penetrating structure of the disclosed carpet gripping projections 135 may be replaced with another structure that produces only surface, rather than, penetrating engagement with the vehicle carpet 60. For example, the underside of the cover body 140 may be provided with a highly textured (e.g., knurled) surface, or the hook portion of a hook and loop fastening system may be installed on the underside of the cover body to releasably grip the exposed surface of the carpet pile layer. Other undisclosed engagement mechanisms may also be employed, as long as an acceptable level of cover sliding prevention is produced.

Referring again to FIG. 5, it can be observed that a section 150 of material may be optionally installed to the underside of the VIN cover 100 to fill in the cavity created by the VIN window 55. In this exemplary embodiment, the section of the carpet insulator layer 90 that was previously removed to create the VIN window 55 is recovered and used for this purpose. In other embodiments, other material may be used in a similar manner. It is noted, however, that using the previously cut out section of the carpet insulator layer 90 reduces waste, and the cut out section is already of correct size and shape.

As shown, the section 150 of material may be inserted into the cavity formed by the upstanding wall 110 of the carpet engaging structure 105 and retained by compression of the material and/or by the use of an adhesive, etc. Other mounting and retention techniques are, of course, also possible. While installation of such a section of material to the underside of the VIN cover is not critical to the invention, it is believed that employing an appropriate section of material (e.g., a section of insulator layer material) in this manner may help to optimize vehicle noise, vibration and harshness (NVH) characteristics.

While certain embodiments of the present invention are described in detail above, the scope of the invention is not to be considered limited by such disclosure, and modifications are possible without departing from the spirit of the invention as evidenced by the following claims:

What is claimed is:

1. A one-piece, removable vehicle carpet cutout cover for a floor-located vehicle identification number (VIN), comprising:
 a cover body adapted for repeated installation to and removal from the vehicle carpet cutout;
 an upstanding wall extending substantially transversely from an underside of the cover body and located to enter a VIN viewing window located in a vehicle carpet to which the cover will be installed;
 at least one carpet retention element extending at least partially transversely away from the upstanding wall, the at least one carpet retention element adapted to trap a portion of a vehicle carpet between the at least one carpet retention element and the cover body so as to removably secure the cover to the vehicle carpet, the at least one carpet retention element having a shape that facilitates subsequent removal of the installed cover from a location above the vehicle carpet.

2. The cover of claim 1, wherein the cover is made of a thermoplastic elastomer.

3. The cover of claim 1, wherein the cover body is of substantially rectangular shape.

4. The cover of claim 1, wherein the upstanding wall traces a path that substantially mimics the shape of a VIN viewing window located in a vehicle carpet to which the cover will be installed.

5. The cover of claim 1, wherein the at least one carpet retention element is located and adapted to trap both a backing layer and pile layer of a vehicle carpet between the at least one carpet retention element and an underside of the cover body.

6. The cover of claim 1, wherein the at least one carpet retention element is a plurality of carpet retention tabs located and adapted to trap a backing layer and pile layer of a vehicle carpet between the carpet retention tabs and an underside of the cover body.

7. The cover of claim 6, wherein the plurality of carpet retention tabs are located on opposing outer sides of an area defined by the upstanding wall.

8. The cover of claim 1, further comprising a carpet gripping structure located on an underside of the cover body.

9. The cover of claim 8, wherein the carpet gripping structure includes a plurality of pointed projections that are adapted to penetrate at least partially into a vehicle carpet to which the cover will be installed.

10. The cover of claim 1, wherein the cover body is shaped and dimensioned to fit within a VIN cover recess formed around a VIN viewing window in a vehicle carpet to which the cover will be installed.

11. A one-piece removable cover for a vehicle carpet window through which an underlying, floor-located vehicle identification number (VIN) is viewable, comprising:
 a substantially planar cover body adapted for repeated installation to and removal from the vehicle carpet window; and
 a carpet engaging structure on an underside of the cover body, the carpet engaging structure including:
  an upstanding wall extending from an underside of the cover body and located to enter a VIN viewing window located in a vehicle carpet to which the cover will be installed, and
  at least one carpet retention tab extending from the cover body, the at least one carpet retention tab having a portion that projects at least partially transversely away from the upstanding wall so as to form a groove between the at least one carpet retention element and the cover body, the at least one carpet retention element adapted to trap a portion of a vehicle carpet within the groove and having an upper surface that slopes downwardly away from the upstanding wall so as to facilitate removal of the cover after installation thereof in the carpet window.

12. The cover of claim 11, wherein the cover is made of a thermoplastic elastomer.

13. The cover of claim 11, wherein the cover body is of substantially rectangular shape and is dimensioned to fit within a VIN cover recess formed around a VIN viewing window in a vehicle carpet to which the cover will be installed.

14. The cover of claim 11, wherein the upstanding wall traces a path that substantially mimics the shape of a VIN viewing window located in a vehicle carpet to which the cover will be installed.

15. The cover of claim 11, wherein a plurality of carpet retention tabs are located on opposing outer sides of an area defined by the upstanding wall.

16. The cover of claim 11, further comprising a carpet gripping structure located on an underside of the cover body.

17. The cover of claim 16, wherein the carpet gripping structure includes a plurality of pointed projections that are adapted to penetrate at least partially into a vehicle carpet to which the cover will be installed.

18. A removable cover for a floor-located vehicle identification number (VIN) viewable through a window provided in an overlying vehicle carpet, comprising:
 a substantially planar cover body adapted for repeated installation to and removal from the vehicle carpet window;
 a carpet engaging structure on an underside of the cover body, the carpet engaging structure including:
  an upstanding wall extending from an underside of the cover body, the upstanding wall adapted to enter, and to trace a path that substantially mimics the size and shape of a VIN viewing window located in a vehicle carpet to which the cover will be installed,
  at least one carpet hooking tab extending at least partially transversely outward from one side of the upstanding wall, and at least one carpet engaging tab extending at least partially transversely away from an opposite side of the upstanding wall, the at least one carpet hooking tab extending from the upstanding wall a greater distance than the at least one carpet engaging tab, at least one of the carpet hooking tab and carpet engaging tab having an upper surface that slopes downwardly away from the upstanding wall so as to facilitate removal of the cover after installation thereof in the carpet window; and
 a carpet gripping structure in the form of plurality of pointed projections located on an underside of the cover body;
 wherein, during installation of the cover, the at least one hooking tab is engageable with an exposed corresponding edge of the window in the vehicle carpet, thereby permitting the cover to be subsequently rotated downward such that the at least one engaging tab will enter the window opening and engage a corresponding opposite edge of the window in the vehicle carpet.

19. The cover of claim 18, wherein the cover is made of a thermoplastic elastomer.

20. The cover of claim 18, wherein the cover body is of substantially rectangular shape and is dimensioned to fit within a VIN cover recess formed around a VIN viewing window in a vehicle carpet to which the cover will be installed.

\* \* \* \* \*